United States Patent
Luo et al.

(10) Patent No.: US 9,692,304 B1
(45) Date of Patent: Jun. 27, 2017

(54) INTEGRATED POWER STAGE DEVICE WITH OFFSET MONITOR CURRENT FOR SENSING A SWITCH NODE OUTPUT CURRENT

(71) Applicant: FAIRCHILD SEMICONDUCTOR CORPORATION, San Jose, CA (US)

(72) Inventors: Jo Luo, San Jose, CA (US); Jon Gladish, San Jose, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/007,570

(22) Filed: Jan. 27, 2016

Related U.S. Application Data

(60) Provisional application No. 62/110,200, filed on Jan. 30, 2015.

(51) Int. Cl.
*H02M 3/158* (2006.01)
*H02M 1/00* (2006.01)

(52) U.S. Cl.
CPC ......... *H02M 3/158* (2013.01); *H02M 3/1582* (2013.01); *H02M 2001/0009* (2013.01)

(58) Field of Classification Search
None
See application file for complete search history.

(56) References Cited

U.S. PATENT DOCUMENTS

| | | | |
|---|---|---|---|
| 6,831,329 B2 | 12/2004 | Yedinak et al. | |
| 8,247,269 B1 | 8/2012 | Liu | |
| 8,829,624 B2 | 9/2014 | Gladish et al. | |
| 8,884,597 B2 | 11/2014 | Gladish et al. | |
| 2012/0326783 A1* | 12/2012 | Mathe | H03F 1/0227 330/251 |
| 2014/0253062 A1* | 9/2014 | Qin | G05F 1/10 323/271 |
| 2014/0354168 A1* | 12/2014 | Hyeon | H05B 37/02 315/209 R |
| 2015/0035510 A1* | 2/2015 | Hoshino | H02M 3/157 323/283 |
| 2015/0102786 A1* | 4/2015 | Kim | H02M 1/4225 323/208 |
| 2015/0115923 A1* | 4/2015 | Shao | H02M 3/158 323/283 |

OTHER PUBLICATIONS

Fairchild—Smart Power Stage (SPS) Portfolio, 2015, 2 pages.
Fairchild—FDMF3037 Smart Power Stage (SPS) Module, Sep. 2015, 22 pages.
Intel—DrMOS Specifications, Nov. 2014, 17 pages.

* cited by examiner

*Primary Examiner* — Jeffrey Gblende
(74) *Attorney, Agent, or Firm* — Okamoto & Benedicto LLP

(57) ABSTRACT

An integrated power stage device includes a switch node that is coupled to an output inductor. The integrated power stage device generates a monitor current that is a scaled version of the current through the output inductor. The integrated power stage device outputs a single-ended offset monitor current that is equal to the monitor current plus a DC offset current. A PWM controller senses the current through the output inductor by receiving a monitor voltage that is developed from the offset monitor current. The PWM controller generates a PWM signal in accordance with the sensed output inductor current to control a switching operation of a power switch of the integrated power stage device.

18 Claims, 6 Drawing Sheets

US 9,692,304 B1

INTEGRATED POWER STAGE DEVICE WITH OFFSET MONITOR CURRENT FOR SENSING A SWITCH NODE OUTPUT CURRENT

CROSS-REFERENCE TO RELATED APPLICATION

This application claims the benefit of U.S. Provisional Patent Application No. 62/110,200, filed on Jan. 30, 2015, which is incorporated herein by reference in its entirety.

BACKGROUND OF THE INVENTION

1. Field of the Invention

The present invention relates generally to electrical circuits, and more particularly but not exclusively to power supplies.

2. Description of the Background Art

Power supply circuits, such as DC-DC converters, can include a power switch and an output inductor. The power switch can be a metal oxide semiconductor field effect transistor (MOSFET), for example. The switching operation of the power switch is controlled, e.g., by pulse-width modulation (PWM), to maintain a regulated output voltage. The power switch can be used in conjunction with a synchronous diode or synchronously with another power switch.

An integrated power stage device includes the power switch and a power switch driver in the same chip, i.e., in the same integrated circuit (IC) package. Example integrated power stage devices include the Smart Power Stage™ (SPS) devices from Fairchild Semiconductor and DrMOS (integrated driver-MOSFET) devices. An integrated power stage device does not have an integrated switch controller, and is thus typically employed in conjunction with a separate switch controller, such as a PWM controller IC. The PWM controller controls the switching operation of the power switch based on the current through the output inductor.

SUMMARY

In one embodiment, an integrated power stage device includes a switch node that is coupled to an output inductor. The integrated power stage device generates a monitor current that is a scaled version of the current through the output inductor. The integrated power stage device outputs a single-ended offset monitor current that is equal to the monitor current plus a DC (direct current) offset current. A PWM controller senses the current through the output inductor by receiving a monitor voltage that is developed from the offset monitor current. The PWM controller generates a PWM signal in accordance with the sensed output inductor current to control a switching operation of a power switch of the integrated power stage device.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of electrical circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
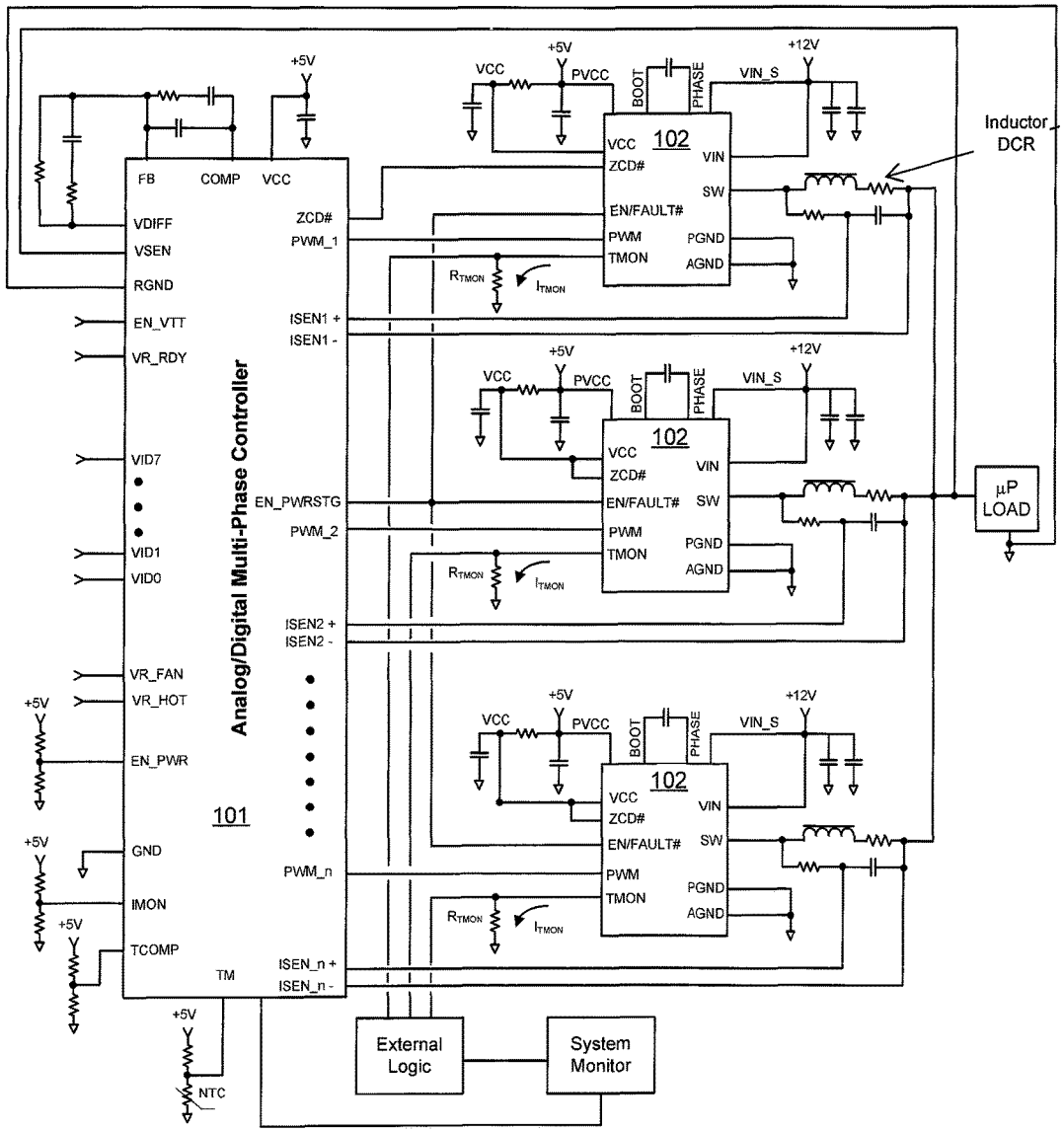
FIG. 1 shows a schematic diagram of an example multi-phase power supply with output filter DC resistance (DCR) sensing.

FIG. 1 shows a schematic diagram of an example multi-phase power supply. In the example of FIG. 1, the power supply includes a PWM controller 101 and a plurality of integrated power stage devices 102. The power supply of FIG. 1 is a multi-phase power supply, and includes a separate integrated power stage device 102 for each output phase.

The PWM controller 101 controls the switching operation of a power switch in an integrated power stage device 102 based on the sensed switch node (see SW pin) output current of that integrated power stage device 102. In the example of FIG. 1, the PWM controller 101 includes differential current sense input pins (ISENSE+, ISENSE−) for receiving a differential current signal indicative of the output current at the switch node. The output current sensing method can be in accordance with a differential current sensing method for sensing the output filter DC resistance, i.e., output inductor DCR.

Figure 2:
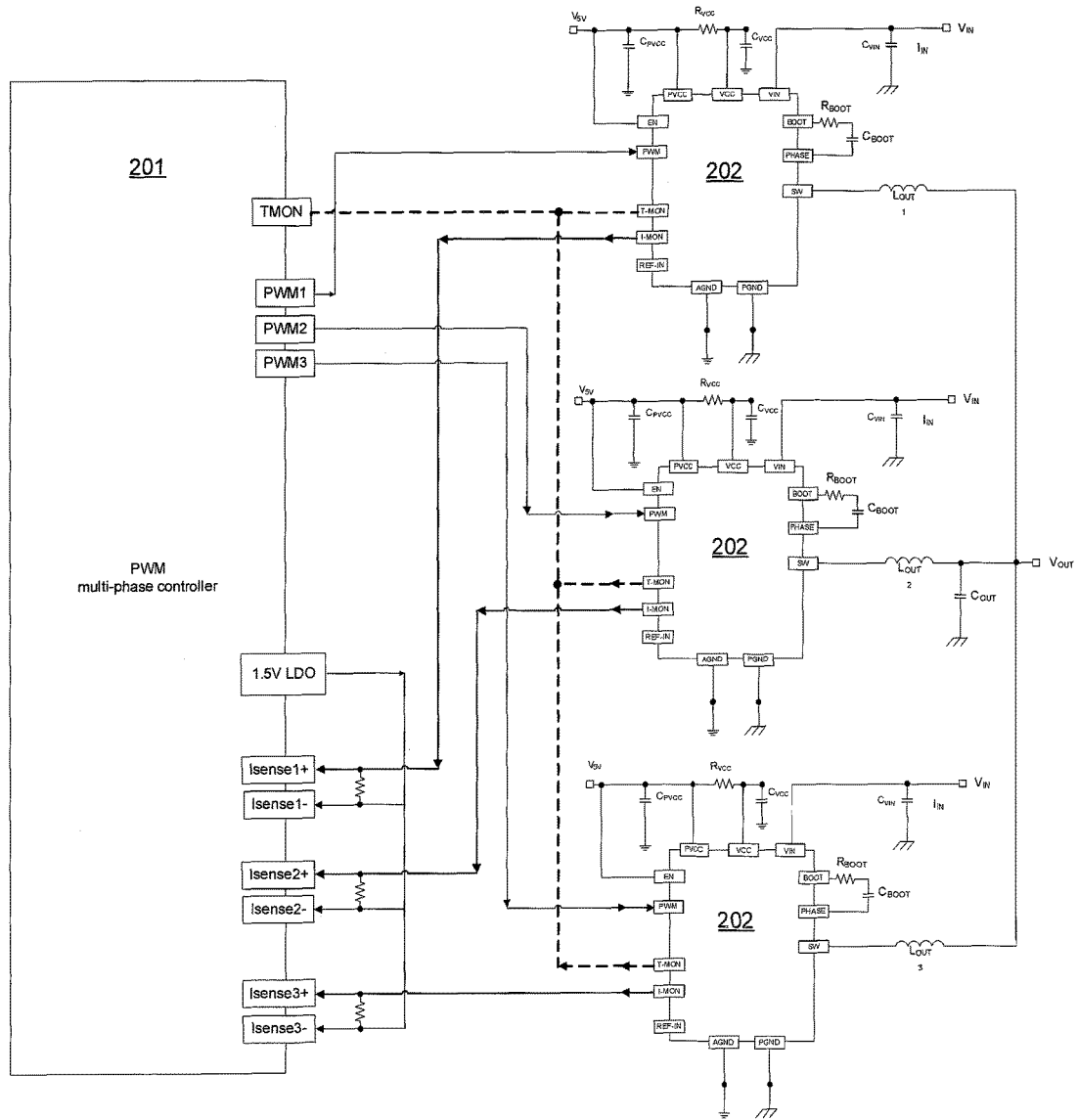
FIG. 2 shows a schematic diagram of an example multi-phase power supply with monitor current sensing.

FIG. 2 shows a schematic diagram of another example multi-phase power supply. In the example of FIG. 2, the power supply includes a PWM controller 201 and a plurality of integrated power stage devices 202. The power supply of FIG. 2 is a multi-phase power supply, and includes a separate integrated power stage device 202 for each output phase. The power supply of FIG. 2 is similar to that of FIG. 1 except for the use of a monitor current ($I_{MON}$), instead of inductor DCR, to sense output current at a switch node.

In the example of FIG. 2, an integrated power stage device 202 has an IMON pin for outputting the monitor current $I_{MON}$, which is differentially received by the PWM controller 201 on corresponding differential current sense input pins. In the example of FIG. 2, the PWM controller 201 includes an internal low dropout (LDO) regulator that generates a 1.5V output, which is used in conjunction with the monitor current $I_{MON}$ to form a differential monitor current input to the PWM controller 201. In the example of FIG. 2, the monitor current $I_{MON}$ is a single-ended current signal that does not necessarily need a REFIN signal to be input to the integrated power stage device 202.

Figure 3:
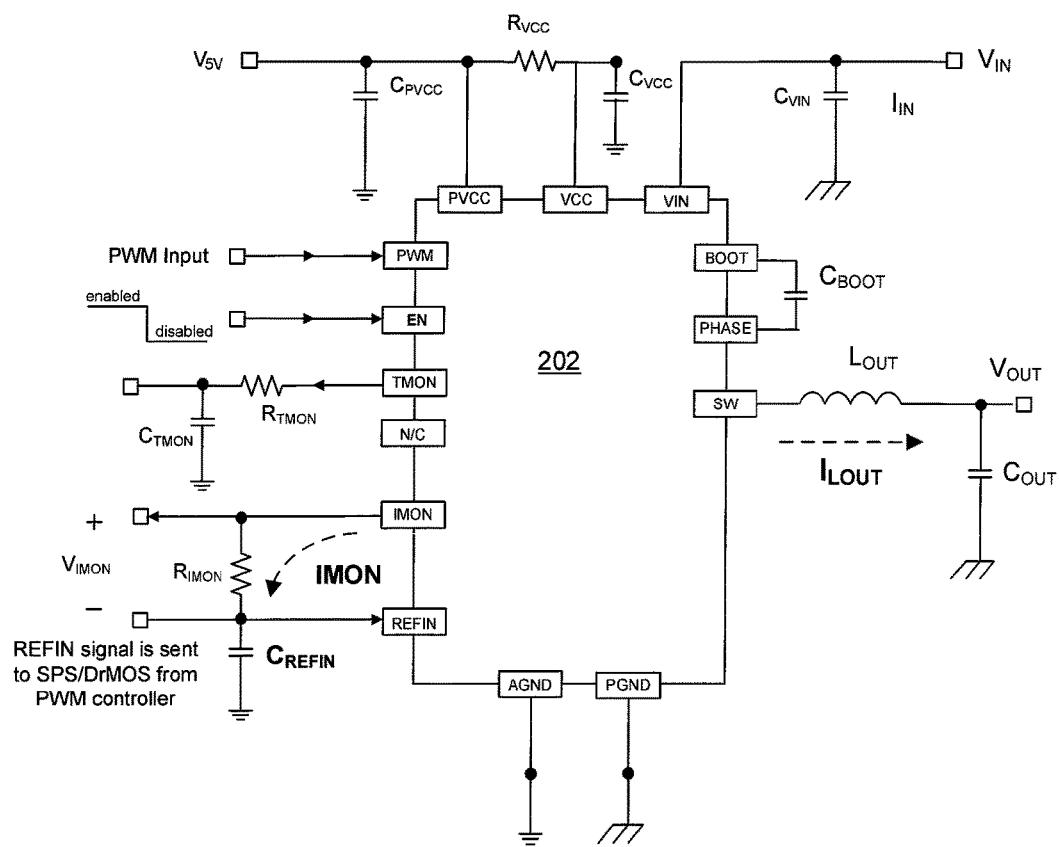
FIG. 3 shows a schematic diagram of an example integrated power stage device that is configured for monitor current sensing.

FIG. 3 shows a schematic diagram of an example integrated power stage device 202 that is configured for monitor current sensing. Generally speaking, the monitor current $I_{MON}$ is a high bandwidth, real-time signal that replicates the switch node output current, i.e., the output inductor current ($I_{LOUT}$), to the load. The monitor current $I_{MON}$ is typically a scaled version of the output inductor current $I_{LOUT}$. A predetermined conversion factor C allows for determination of the output inductor current given the value of the monitor current $I_{MON}$. The conversion factor C is the gain of the monitor current $I_{MON}$.

A REFIN signal is an external DC signal that is provided by the PWM controller to the REFIN pin of the integrated power stage device 202 to establish a reference voltage for the monitor current $I_{MON}$. The REFIN signal voltage is set to correspond to $I_{LOUT}$=0 A. The REFIN signal voltage is regulated within a few percent of accuracy (e.g., REFIN=1V+/−2%).

The monitor current $I_{MON}$ develops a monitor voltage $V_{IMON}$ on the monitor resistor $R_{IMON}$. The voltage $V_{IMON}$ is indicative of the output inductor current $I_{OUT}$. Because the voltage $V_{IMON}$ is referenced to the REFIN pin of the integrated power stage device 202, the REFIN signal has voltage-range restrictions since the current monitor $I_{MON}$ analog circuitry (e.g., amplifiers) in the integrated power stage device 202 requires headroom to operate properly. For example, the REFIN signal can be set by the user to operate between 0.8V to 2.0V.

Monitor current sensing, i.e., $I_{MON}$ sensing, can be more accurate than inductor DCR sensing. However, monitor current sensing may require particular communication between the PWM controller and the integrated power stage devices, especially with the IMON and REFIN pins of the integrated power stage devices. The operating range of the REFIN signal voltage can be challenging to define and establish and must be set within a tight tolerance voltage range. The REFIN pin must also be able to sink/source current from a corresponding IMON pin. In addition, a REFIN signal must be provided to all integrated power stage devices of the multi-phase power supply.

Figure 4:
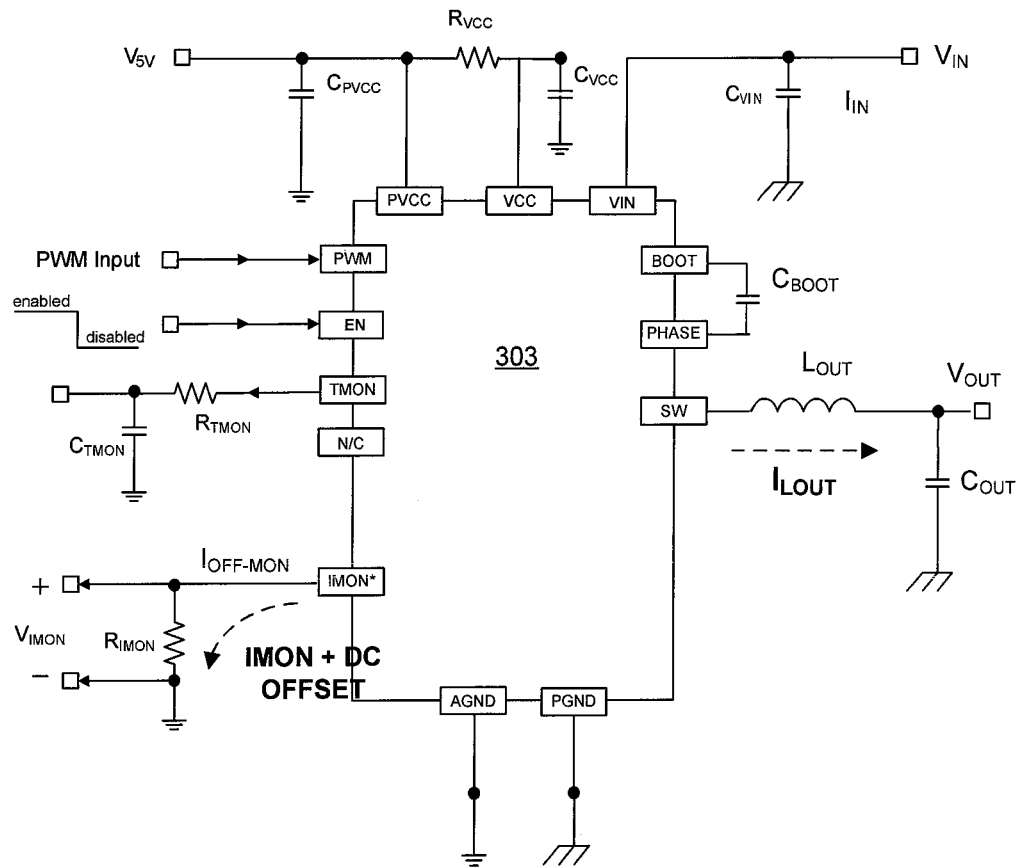
FIG. 4 shows a schematic diagram of an integrated power stage device in accordance with an embodiment of the present invention.

FIG. 4 shows a schematic diagram of an integrated power stage device 303 in accordance with an embodiment of the present invention. In the example of FIG. 4, the integrated power stage device 303 is embodied in an IC package comprising a plurality pins, including a PVCC pin for receiving a dedicated power source for gate driver output, a VCC pin for receiving a supply voltage, a VIN pin for receiving an input voltage, BOOT and PHASE pins for receiving a power source for a high side driver that resides in the boot-phase power domain, an EN pin for receiving an enable signal for enabling/disabling the integrated power stage device 303, an SW pin that is connected to the output switch node, a TMON pin for outputting a temperature monitor signal, and a PWM pin for receiving an external PWM signal for controlling the switching operation of the integrated power switch of the integrated power stage device 303. In one embodiment, the integrated power stage device 303 does not include an integrated PWM controller, and is thus typically employed in conjunction with a separate, external PWM controller.

In the example of FIG. 4, the integrated power stage device 303 further includes an IMON* pin that outputs an offset monitor current $I_{OFF-MON}$ that is equal to the monitor current $I_{MON}$ plus a DC offset current. That is, the integrated power stage device 303 offsets the monitor current $I_{MON}$ by a predetermined amount. The IMON pin is labeled as "IMON*" in the example of FIG. 4, i.e., with an asterisk, to indicate that it outputs an offset monitor current.

In the example of FIG. 4, the IMON* pin is an IMON pin with an internally generated DC offset added to the monitor current $I_{MON}$. Accordingly, in the example of FIG. 4, the offset monitor current $I_{OFF-MON}$ is given by $$I_{OFF-MON}=I_{LOUT} \times C + DC\_Offset$$

where, $I_{LOUT}$ is the output inductor current, C is a predetermined conversion factor, and DC_Offset is a predetermined DC offset. The offset monitor current $I_{OFF-MON}$ is thus indicative of the output current of the integrated switch device 303. As a particular example, the offset monitor current $I_{OFF-MON}$ may be given by $$I_{OFF-MON}=I_{LOUT} \times (5 \text{ uA/A}) + 1 \text{ mA}$$

when the conversion factor is 5 uA/A and the DC offset is 1 mA. Therefore, the output inductor current $I_{LOUT}$ can be determined from the offset monitor current $I_{OFF-MON}$ given the conversion factor and the DC offset. Advantageously, the offset monitor current $I_{OFF-MON}$ is a single-ended signal that can be utilized for sensing the output inductor current $I_{LOUT}$ at the switch node without requiring an external REFIN signal to establish a reference voltage.

In the example of FIG. 4, the offset monitor current $I_{OFF-MON}$ develops a monitor voltage $V_{IMON}$ on the resistor $R_{IMON}$. Because the offset monitor current $I_{OFF-MON}$ is the monitor current $I_{MON}$ plus a DC offset, the resistance of $R_{IMON}$ multiplied by the DC offset gives the value of the voltage $V_{IMON}$ when the monitor current $I_{MON}$ is zero. The resistance of $R_{IMON}$ multiplied by the offset monitor current $I_{OFF-MON}$ also sets the gain for the voltage $V_{IMON}$. The PWM controller can thus sense the output inductor current $I_{LOUT}$ from the voltage $V_{IMON}$.

As particular examples, assuming DC offset=1 mA, conversion factor=5 uA/A, $R_{IMON}$=1 kohm:
When $I_{LOUT}$=0 A, $I_{OFF-MON}$(0 A)=1 mA and $V_{IMON(0 \ A)}$=1.0V.
When $I_{LOUT}$=20 A, $I_{OFF-MON}$ (20 A)=1 mA+20 A×5 uA/A=1.1 mA and $V_{IMON(0 \ A)}$=1.1V.
When $I_{LOUT}$=−20 A, $I_{OFF-MON}$(−20 A)=1 mA+(−20 A)×5 uA/A=0.9 mA and $V_{IMON(0 \ A)}$=0.9V.

Figure 5:
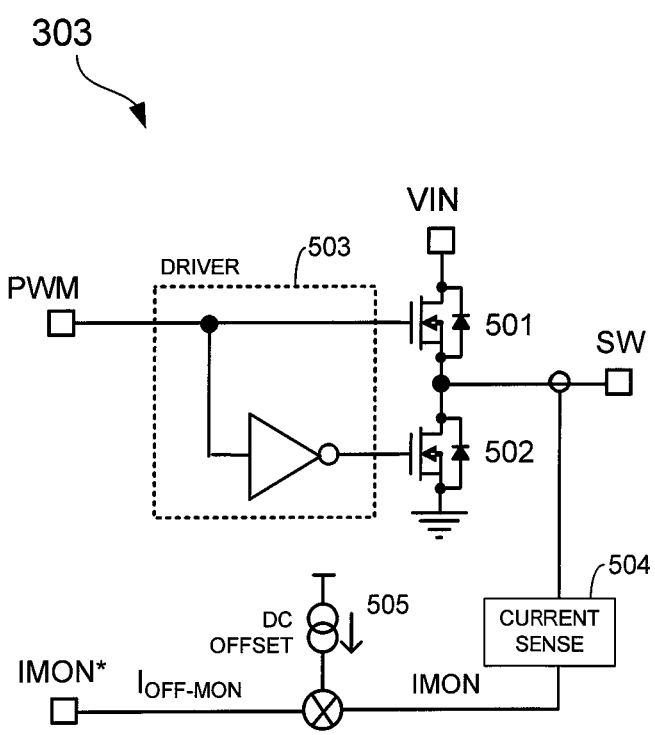
FIG. 5 shows further details of the integrated power stage device of FIG. 4 in accordance with an embodiment of the present invention.

FIG. 5 shows a schematic diagram of an integrated power stage device 303 in accordance with an embodiment of the present invention. In the example of FIG. 5, the power stage device 303 includes an integrated power switch 501 (e.g., N-channel MOSFET), a synchronous switch 502 (e.g., N-channel MOSFET), a switch driver 503, a current sense circuit 504, and a DC offset generator 505. Other components of the integrated power stage device 303 are not shown for clarity of illustration.

In the example of FIG. 5, the switch driver 503 receives a PWM signal at the PWM pin to control the switching operation of the integrated power switch 501. The SW pin is connected to the switch node, which in the example of FIG. 5 is on the source of the integrated power switch 501 and the drain of the synchronous switch 502. The integrated power switch 501 connects and disconnects the input voltage at the VIN pin to the switch node in accordance with the PWM signal received at the PWM pin. The current sense circuit 504 senses the output current of the integrated power stage device 303 at the switch node to generate a monitor current IMON that is indicative of the output current. In the example of FIG. 5, the DC offset generator 505 comprises a DC current source that generates a DC offset current, which is added to the monitor current IMON to generate the offset monitor current $I_{OFF-MON}$ that is output at the IMON* pin.

In light of the present disclosure, one of ordinary skill in the art will appreciate that the integrated power stage device 303 may also be implemented by making a metal change or other modification to a suitable integrated power stage device (e.g., Fairchild Semiconductor SPS™ device) to add a DC offset current to a monitor current $I_{MON}$ output at an IMON pin, for example.

Figure 6:
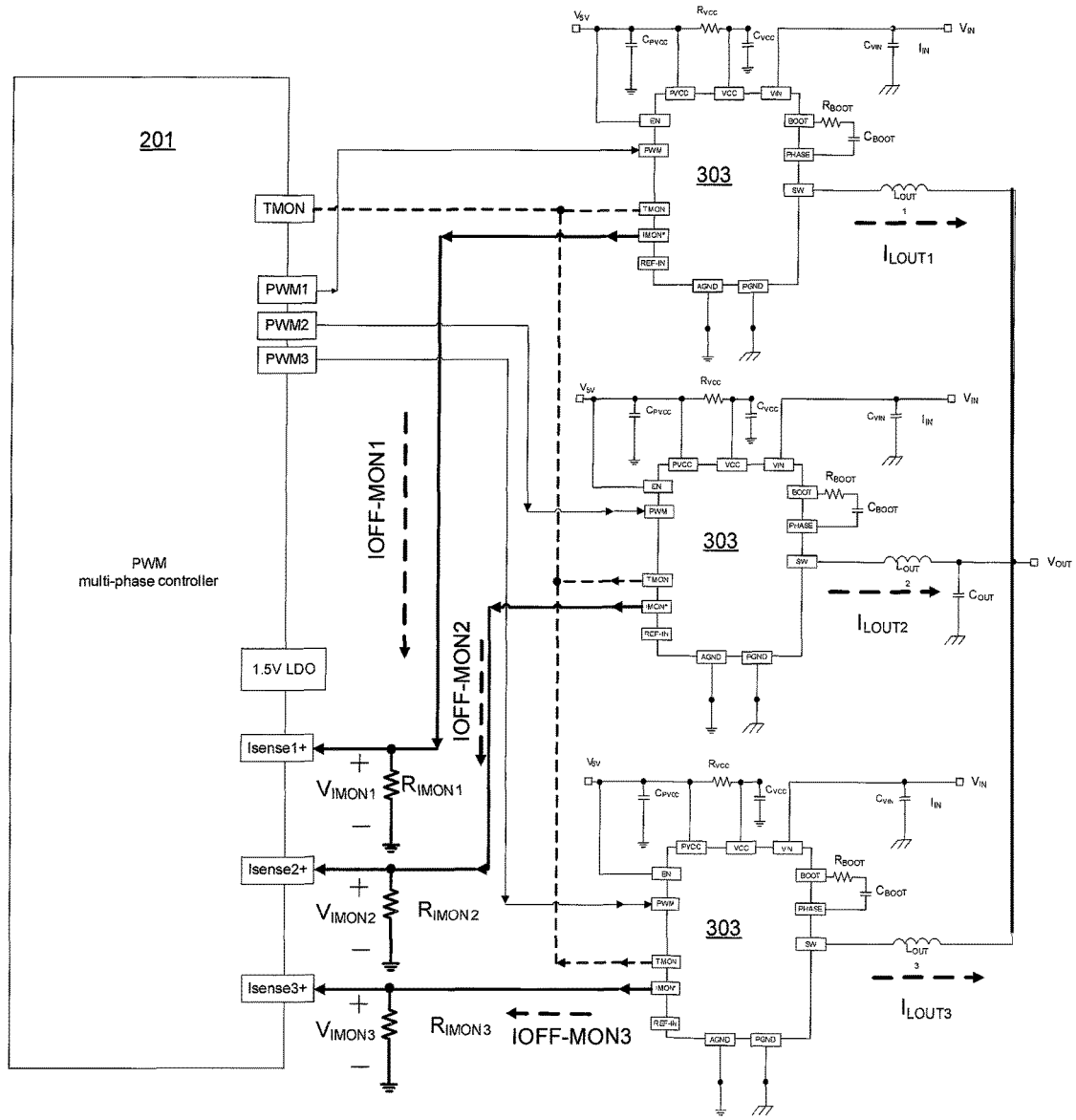
FIG. 6 shows a schematic diagram of a multi-phase power supply in accordance with an embodiment of the present invention.

FIG. 6 shows a schematic diagram of a multi-phase power supply in accordance with an embodiment of the present invention. In the example of FIG. 6, the power supply includes a PWM controller 201 and a plurality of integrated power stage devices 303, one for each output phase. Each integrated power stage device 303 provides an offset monitor current $I_{OFF-MON}$ (i.e., $I_{OFF-MON1}$, $I_{OFF-MON2}$, $I_{OFF-MON3}$) to the PWM controller 201 to allow the PWM controller 201 to sense its output inductor current $I_{LOUT}$ (i.e., $I_{LOUT1}$, $I_{LOUT2}$, $I_{LOUT3}$). The PWM controller 201 generates a PWM signal for each integrated power stage device 303 according to a corresponding output inductor current $I_{LOUT}$. In each integrated power stage device 303, a switch driver drives a power switch in accordance with a PWM signal received from the PWM controller 201.

Because an offset monitor current $I_{OFF-MON}$ is single-ended, the PWM controller 201 can receive the offset monitor current $I_{OFF-MON}$ on a single pin, which in the example of FIG. 6 is an ISENSE+pin. Being single-ended, an offset monitor current $I_{OFF-MON}$ is presumed to be referenced to the signal ground.

In light of the present disclosure, one of ordinary skill in the art will appreciate that embodiments of the present invention advantageously simplify the design of multi-phase power supplies that have integrated power stage devices. Embodiments of the present invention eliminate the need for a user-supplied REFIN voltage, which must be well regulated and must be able to sink/source current. User supplied REFIN voltage must also be set to a DC value in accordance with integrated power stage device operation range. These limitations make conventional monitor current sensing relatively cumbersome to implement. In marked contrast, in some embodiments of the present invention, a user can simply implement a resistor (RIMON) of choice to set the monitor voltage offset/gain ($V_{IMON}=I_{OFF-MON} \times R_{IMON}$). A suitable PWM controller can also readily convert the offset monitor current $I_{OFF-MON}$ into a voltage signal. Furthermore, embodiments of the present invention eliminate the need for differential monitor current sensing for PWM controllers.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A power supply comprising:
a first integrated power stage device comprising a power switch and a switch driver, the first integrated power stage device including a switch node that is coupled to a first output inductor and is configured to output a single-ended first current that is equal to a second current plus a first direct current (DC) offset current, the second current being a scaled version of a current through the first output inductor; and
a pulse-width modulation (PWM) controller that is external to the first integrated power stage device, the PWM controller being configured to receive a first monitor voltage developed from the single-ended first current to sense the current through the first output inductor and is configured to output a first PWM signal to control switching of the power switch of the first integrated power stage device in accordance with the current through the first output inductor as indicated by the first monitor voltage,
wherein the PWM controller is configured to receive a second monitor voltage developed from a single-ended third current that is output by a second integrated power stage device to sense a current through a second output inductor coupled to a switch node of the second integrated power stage device, and to output a second PWM signal to control a power switch of the second integrated power stage device in accordance with the current through the second output inductor as indicated by the second monitor voltage,
wherein the second integrated power stage device is external to the PWM controller and the single-ended third current is equal to a fourth current plus a second DC offset current, the fourth current being a scaled version of the current through the second output inductor.

2. The power supply of claim 1, wherein the power supply is a multi-phase power supply and each of the first and second integrated power stage devices corresponds to an output phase of the multi-phase power supply.

3. The power supply of claim 1, wherein the first monitor voltage, when the current through the first output inductor is zero, is equal to a product of the first DC offset current and a resistance of a resistor on which the first monitor voltage is developed.

4. The power supply of claim 1, wherein the first integrated power stage device further comprises a DC current source that generates the first DC offset current.

5. A method of operating a power supply, the method comprising:
receiving, in a first integrated power stage device, a first switch control signal from an external switch controller;
controlling a switching operation of a power switch of the first integrated power stage device in accordance with the first switch control signal;
sensing an output current of the first integrated power stage device to generate a first monitor current that is indicative of the output current of the first integrated power stage device;
adding a DC offset to the first monitor current to generate a first offset monitor current;
providing the first offset monitor current to the external switch controller;
generating, by the external switch controller, the first switch control signal based on the output current of the first integrated power stage device as indicated by the first offset monitor current,
receiving, in a second integrated power stage device, a second switch control signal from the external switch controller;
controlling a switching operation of a power switch of the second integrated power stage device in accordance with the second switch control signal;
sensing an output current of the second integrated power stage device to generate a second monitor current that is indicative of the output current of the second integrated power stage device;
adding a DC offset to the second monitor current to generate a second offset monitor current;
providing the second offset monitor current to the external switch controller; and
generating, by the external switch controller, the second switch control signal based on the output current of the second integrated power stage device as indicated by the second offset monitor current.

6. The method of claim 5, wherein the external switch controller comprises a pulse width modulation (PWM) controller and the first switch control signal comprises a PWM signal.

7. The method of claim 5, further comprising:
developing a monitor voltage using the first offset monitor current,
wherein the external switch controller detects the output current of the first integrated power stage device from the monitor voltage.

8. The method of claim 7, wherein the monitor voltage is equal to a product of the first offset monitor current and a resistance of a resistor on which the monitor voltage is developed when the output current of the first integrated power stage device is zero.

9. The method of claim 5, wherein the power supply comprises a multi-phase power supply and each of the first and second integrated power stage devices outputs a phase of the multi-phase power supply.

10. The method of claim 5, wherein each of the first and second offset monitor currents is a single-ended current signal that is referenced to signal ground.

11. An integrated power stage device that is an integrated circuit with a plurality of pins, the integrated power stage device comprising:
a first pin in the plurality of pins, the first pin being configured to receive a switch control signal from an external switch controller;
a power switch;
a switch driver that is configured to drive the power switch in accordance with the switch control signal to generate an output current at a switch node;
a second pin in the plurality of pins, the second pin being configured to be is coupled to the switch node; and
a third pin in the plurality of pins, the third pin being configured to output an offset monitor current, the offset monitor current comprising a DC offset plus a monitor current that is indicative of the output current, the third pin being configured to be coupled to one of a plurality of current sense input pins of the external switch controller.

12. The integrated power stage device of claim 11, wherein the external switch controller comprises a pulse width modulation (PWM) controller, and the first pin is coupled to a PWM signal output of the PWM controller.

13. The integrated power stage device of claim 11, wherein the switch control signal is a PWM signal.

14. The integrated power stage device of claim 11, wherein the third pin is coupled to a resistor, the offset monitor current develops a monitor voltage on the resistor, and the switch control signal is generated by the external switch controller based on the output current as indicated by the monitor voltage.

15. The integrated power stage device of claim 11, further comprising:
a DC offset generator that generates the DC offset.

16. The integrated power stage device of claim 15, wherein the DC offset generator comprises a DC current source.

17. The integrated power stage device of claim 11, further comprising:
a fourth pin in the plurality of pins, the fourth pin being configured to receive an input voltage, and
wherein the switch node is on a source of the power switch and a drain of the power switch is connected to the fourth pin.

18. The integrated power stage device of claim 11, wherein the power switch comprises a MOSFET.

* * * * *